Patented May 29, 1934

1,960,644

UNITED STATES PATENT OFFICE 1,960,644

2-METHYLAMINOBENZENE-1-CARBOXYLIC ACID-4-SULPHONIC ACID

Anton Ossenbeck, Cologne-Mulheim, and Ernst Tietze, Cologne-on-the-Rhine, Germany, assignors to General Aniline Works, Inc., New York, N. Y., a corporation of Delaware No Drawing. Application August 10, 1932, Serial No. 628,272. In Germany September 9, 1931

1 Claim. (Cl. 260—109)

The present invention relates to 2-alkylaminobenzene-1-carboxylic acid-4-sulphonic acids, more particularly it relates to compounds which may be represented by the general formula:

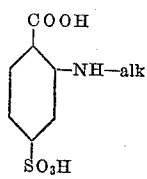

wherein "alk" stands for an alkyl group.

According to our invention these products are prepared by causing a primary aliphatic amine, such as methylamine, ethylamine, propylamine, butylamine, isobutylamine and the like, to act upon a 2-halogenbenzene-1-carboxylic acid-4-sulphonic acid or an alkali metal salt thereof in aqueous solution and at an elevated temperature.

The temperature used may be varied within the widest limits, for example, the process may be carried out between about 40° C. and about 200° C.; generally, however, we are working at temperatures between about 75° C. and about 140° C., and favorably with excess alkylamine.

From the reaction mixture the 2-alkylaminobenzene-1-carboxylic acid-4-sulphonic acids are isolated in the usual manner, for example, by rendering the reaction mass alkaline to caustic soda, distilling off the excess alkylamine and precipitating the 2-alkylaminobenzene-1-carboxylic acid-4-sulphonic acids by the addition of an acid.

The 2-alkylaminobenzene-1-carboxylic acid-4-sulphonic acids are generally colorless crystalline substances, difficultly soluble in water, in form of their alkali metal salts easily soluble in water; they are valuable intermediate products for the manufacture of dyestuffs and synthetic drugs.

If desired, our new process may be carried out with the addition of a suitable catalyst, such as copper or a copper salt, for example cuprous chloride.

The invention is illustrated by the following examples, without being limited thereto:

Example 1.—23.65 parts by weight of 2-chlorobenzene-1-carboxylic acid-4-sulphonic acid are heated with 33 parts by weight of an aqueous 50% methylamine solution, 11 parts of water and 0.1 part by weight of metallic copper in a closed vessel to 130° C. for 20 hours. The reaction mixture is then rendered strongly alkaline by means of caustic soda and the excess of methylamine is completely blown off with steam. The liquid contains the resulting 2-methylaminobenzene-1-carboxylic acid-4-sulphonic acid in a yield of 85% of the theoretical. It is separated by rendering the reaction mass strongly acid by means of hydrochloric acid and salting out from the solution by saturation with sodium chloride.

When working in an analogous manner without the presence of the catalyst a yield of about 80% of the theoretical is obtained.

Example 2.—The neutral solution of the sodium salt of 50 parts by weight of 2-chlorobenzene-1-carboxylic acid-4-sulphonic acid in 100 parts of water is heated with 45 parts by weight of 100% n-butylamine to 80° C. for 12 hours under reflux. The reaction mixture is worked up by rendering alkaline by means of caustic soda and boiling until n-butylamine no longer escapes. The solution is then evaporated until crystallization occurs and the 2-n-butylaminobenzene-1-carboxylic acid-4-sulphonic acid is isolated in the form of the acid sodium salt. The yield is almost equal to the theoretical.

Example 3.—When the neutral solution of 50 parts by weight of 2-chlorobenzene-1-carboxylic acid-4-sulphonic acid is heated as described in Example 2 with 22 parts by weight of 100% ethylamine to 110–120° C. for 12 hours, there is produced in satisfactory yield 2-ethylaminobenzene-1-carboxylic acid-4-sulphonic acid, which after driving off the excess of ethylamine can readily be isolated in the form of the acid sodium salt.

When the ethylamine is replaced by equivalent quantities of n-propylamine, isobutylamine or isoamylamine there are produced in a perfectly analogous manner the corresponding salts of 2-n-propylaminobenzene-, isobutylaminobenzene- or isoamylaminobenzene-1-carboxylic acid-4-sulphonic acid.

We claim:

As a new product 2-methylaminobenzene-1-carboxylic acid-4-sulphonic acid, being a colorless, crystalline substance, soluble in water and being a valuable intermediate product for the manufacture of dyestuffs and synthetic drugs.

ANTON OSSENBECK.
ERNST TIETZE.